(12) United States Patent
Kolo

(10) Patent No.: US 8,793,279 B2
(45) Date of Patent: Jul. 29, 2014

(54) NAME CHARACTERISTIC ANALYSIS SOFTWARE AND METHODS

(76) Inventor: Brian Kolo, Leesburg, VA (US)

(*) Notice: Subject to any disclaimer, the term of this patent is extended or adjusted under 35 U.S.C. 154(b) by 0 days.

(21) Appl. No.: 13/045,497

(22) Filed: Mar. 10, 2011

(65) Prior Publication Data

US 2012/0016834 A1    Jan. 19, 2012

Related U.S. Application Data

(63) Continuation of application No. 12/003,972, filed on Jan. 4, 2008, now Pat. No. 7,933,901.

(60) Provisional application No. 60/878,415, filed on Jan. 4, 2007.

(51) Int. Cl.
    *G06F 17/30*    (2006.01)

(52) U.S. Cl.
    CPC ............................... *G06F 17/30289* (2013.01)
    USPC .......................................................... 707/790

(58) Field of Classification Search
    CPC ................................................. F06F 17/30289
    USPC ......................................... 707/603, 671, 790
    See application file for complete search history.

(56) References Cited

U.S. PATENT DOCUMENTS

| | | | |
|---|---|---|---|
| 5,873,056 A * | 2/1999 | Liddy et al. | 704/9 |
| 6,408,271 B1 * | 6/2002 | Smith et al. | 704/257 |
| 7,505,969 B2 * | 3/2009 | Musgrove et al. | 1/1 |
| 2002/0095289 A1 * | 7/2002 | Chu et al. | 704/258 |
| 2002/0173945 A1 * | 11/2002 | Fabiani et al. | 704/1 |
| 2003/0126009 A1 * | 7/2003 | Hayashi et al. | 705/10 |
| 2004/0162834 A1 * | 8/2004 | Aono et al. | 707/100 |
| 2005/0108011 A1 * | 5/2005 | Keough et al. | 704/243 |
| 2005/0169405 A1 * | 8/2005 | Dominique et al. | 375/341 |

OTHER PUBLICATIONS

Bonaventura et al.,, "A Hybrid Model for the Prediction of the Linguistic Origin of Surnames", IEEE Transactions on Knowledge and Data Engineering, May 2003, vol. 15 , Issue:3, p. 760-763. Retrieved from the Internet<URL: http://ieeexplore.ieee.org/stamp/stamp.jsp?tp =&arnumber=1198404>).*

* cited by examiner

*Primary Examiner* — Thu-Nguyet Le (57) ABSTRACT

One or more databases may be created through an array of onomastic convolutions performed on lists of names. The creation of one or more databases may result in an array correlating individual onomastic elements and normalized probabilities that the onomastic elements belong to various categorizations. A software program preferably determines all possible onomastic elements within a selected name that may be useful in determining a selected name's categorization. The software program preferably takes the onomastic elements from the selected name and compares the onomastic elements to the one or more databases. The software program preferably executes the one or more algorithms and selects categorizations with the highest probability of matching the onomastic elements. The results of the matching process preferably are displayed to the user in one or more formats depending upon the user's preferences.

4 Claims, 5 Drawing Sheets

FIG. 1a  → (none)

FIG. 1b  → O [medial]
O [final]

FIG. 1c  → (none)

FIG. 1d  → KO [initial]

FIG. 1e  → LO [medial]
LO [final]

FIG. 1f  → (none)

FIG. 1g  → O [medial]

FIG. 1h  → O [medial]

FIG. 1i  → (none)

NAME CHARACTERISTIC ANALYSIS SOFTWARE AND METHODS

FIELD OF THE INVENTION

The invention relates generally to systems and methods for automated analysis of characteristics related to names, and, more particularly, to software and methods for automatically analyzing names to determine nationality, ethnicity, culture, region of origin, clan, sub-clan, age and/or gender.

BACKGROUND OF THE INVENTION

Onomastics or onomatology is the study of all types of proper names and the origins of those proper names. Anthroponomastics is the study of human names.

Onomastics is an extremely complicated field due to numerous naming conventions and variations on naming conventions in use around the globe. In general, the process of matching an individual's name or surname to a possible nationality, region of origin, ethnic origin, culture, clan, sub-clan, age or gender requires an intricate knowledge of the various naming conventions used around the world. While some naming conventions are used throughout a broad area, the use of names or surnames themselves may be restricted to a smaller area.

Using current methods to determine nationality, ethnicity, culture, region of origin, clan, sub-clan, age and/or gender for names is not an efficient process. The process of matching an individual's full name or surname to a possible nationality, region of origin, ethnic origin, culture, clan, sub-clan, age and/or gender is time consuming, complicated, and involves extensive research and effort. Because of these complications, such matching can lead to a high error rate in the hands of the unskilled. A large quantity of time can be consumed manually referencing linguists, name lists, gender lists, and ethnic origin lists.

The inefficiency of current methods of determining nationality, ethnicity, culture, region of origin, clan, sub-clan, age and/or gender for names has become increasing important in recent years. A substantial increase in the existence and availability of large databases containing names has brought about a need for fast, efficient and accurate methods for analyzing names within those databases. In particular, the advent of the "War on Terror" has created a need for analyzing databases and other sources of information to create subjective or objective sublists of individuals requiring further investigation. These subjective or objective sublists are sometimes referred to as "profiling data". In the "War on Terror", any information may be an asset to investigators, including information regarding a terrorist's name, which could help lead to the terrorist's capture. Profiling data in general has become highly sought after by governments, businesses and others.

Several automated software processes have been developed in an attempt to identify characteristics of names found in documents and databases. Anyone who has remarked upon a familiar family name has most likely indirectly grasped some of the basic principles used in existing name analysis software. For example, upon encountering someone named "Fischer", an individual might suspect that the person with that name is of Germanic descent. The association of "Fischer" with Germanic descent is generally triggered by an experience with Germanic sounding names or by noticing the distinctive "sch" letter combination often used in the German language.

The same basic techniques used by individuals to associate the "sch" letter combination with the German language can be applied in a systematic way to large numbers of names with software applications. The software automation of name analysis has resulted in an abundance of cultural and demographic information available to a number of fields and industries, such as marketing, law enforcement, and/or finance.

Existing naming technologies may use a top-down approach to gather cultural and demographic information from names. The top-down approach uses a dictionary file and makes comparisons based on that list. This is the standard technique used by most companies currently operating in the industry.

There are several goals of any software program designed to extract cultural data. These goals include processing information accurately, delivering results quickly, and handling large amounts of information reliably and accurately. Unfortunately, current systems are not adequate at performing these functions. Existing systems are either too slow or have problems utilizing the large amounts of data generated effectively.

Generally, needs exist for improved systems and methods for automated analysis of names. More specifically, needs exist for a software program that can quickly, easily and accurately analyze large amounts of information regarding surnames and/or given names to locate the name's nationality, ethnicity, culture, region of origin, clan, sub-clan, age and/or gender.

SUMMARY OF THE INVENTION

Embodiments of the present invention solve many of the problems and/or overcome many of the drawbacks and disadvantages of the prior art by processing information accurately, delivering results quickly, and handling large amounts of information reliably and accurately.

In particular, embodiments of the invention accomplish this by providing an automated software method for analyzing onomastics to extract nationality, ethnicity, culture, region of origin, clan, sub-clan, age and/or gender. Embodiments of the present invention may be a method of analyzing name characteristics that includes accepting a selected name as input, determining a desired categorization, parsing the selected name into one or more individual onomastic elements, accessing a master database for the desired categorization wherein the master database for the desired categorization comprises vectors for all possible onomastic elements with probabilities that the possible onomastic elements belong to distinct sub-categorizations, accessing one or more vectors corresponding to the one or more individual onomastic elements in the master database for the desired categorization, multiplying the probabilities for each distinct sub-categorization across the one or more vectors for the one or more individual onomastic elements to give weighted probabilities corresponding to each sub-categorization, determining a most probable sub-categorization for the selected name by selecting the largest result of the multiplying step, and outputting the most probable sub-categorization for the selected name.

Under certain embodiments, the probabilities that the possible onomastic elements belong to distinct sub-categorizations and the results of the multiplying step may be normalized.

For certain embodiments, a degree of confidence value for the most probable sub-categorization may be determined and displayed with the most probable sub-categorization.

In preferred embodiments, accepting the selected name as input may be performed by a command line interface or a graphical user interface. For certain embodiments, the most probable sub-categorization may be displayed on a map.

A master database is also an aspect of some preferred embodiments. A master database for the desired categorization may include initial, medial and final vectors for all possible onomastic elements. A master database for the desired categorization may be created by performing onomastic convolutions on a sub-categorization classified list of names. A master database for the desired categorization may be accessed remotely over a network.

In preferred embodiments, a determination may be made as to whether the selected name exists on a sub-categorization classified list of names. If the selected name exists on the sub-categorization classified list of names, then the sub-categorization for the selected name from the sub-categorization classified list of names may be output as the most probable sub-categorization for the selected name. Further, a determination may be made as to whether the selected name exists on a preferred sub-categorization classified list of names. If the selected name exists on the preferred sub-categorization classified list of names, then the sub-categorization for the selected name may be output as the most probable sub-categorization for the selected name. A weighted computation may be performed with the results of the multiplying step, the sub-categorization classified list of names and the preferred sub-categorization list of names for determining and outputting the most probable sub-categorization for the selected name.

Methods of the present invention may be repeated for a series of categorizations. The results of the multiplying steps for each of the series of categorizations may be taken and further multiplied for determining an overall sub-categorization. The largest result of the further multiplying step may be output as the most probable sub-categorization and the series of categorizations may be set to agree with the most probable sub-categorization.

Under certain embodiments, the method may be repeated for a series of selected names. A categorization may be selected from the group consisting of nationality, ethnicity, culture, region of origin, clan, sub-clan, age, gender and combinations thereof.

Certain embodiments of the present invention may also consider additional information about the selected name selected from the group consisting of maiden names, names of spouses, names of siblings and other family members, names of traveling companions, place of birth, travel destinations, names and/or call destinations from phone records, religion, and combinations thereof.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE INVENTION

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Embodiments of the present invention may employ a ground-up approach to name analysis. Onomastic elements within a name are compared to culturally specific patterns. Onomastic elements are preferably individual letters or groups of letters representing some or all of the letters in a name. For example, onomastic elements for the name "Kolo" may include the onomastic elements "KO", "O", "LO", etc. Data representing the position of particular onomastic elements may be determined and included. For example, in the name "Kolo" there is an initial "KO", a medial "O", a medial "LO", a final "O", a final "LO", etc. The method of the present invention may be superior to a top-down approach because the ground-up approach is not encumbered with a large index file that can slow down large searches.

Embodiments of the present invention may include creation of one or more databases through an array of onomastic convolutions performed on lists of names. The creation of one or more databases may result in an array correlating individual onomastic elements and normalized probabilities that the onomastic elements belong to various nationalities, ethnicities, culture, regions of origin, clan, sub-clan, ages, and/or genders. Other characteristics of the selected name may be computed depending on user preference.

Embodiments of the present invention may also include a software program using one or more algorithms to determine categorizations, such as nationality, ethnicity, culture, region of origin, clan, sub-clan, age and/or gender of a selected name. All or some categorizations may be determined during an operation of the software program depending on user preference. The one or more databases are preferably used in at least one of the algorithms to determine nationality, ethnicity, culture, region of origin, clan, sub-clan, age and/or gender of a selected name. Embodiments of the present invention preferably efficiently and accurately extracts characteristics of a selected name and other profiling data based on the selected name entered into the software program. Preferably, a user types a selected name into a command line, graphical user interface or other interface. The software program preferably separates the selected name into onomastics elements and performs the one or more algorithms on the onomastic elements within the selected name. The software program may then display results that indicate nationality, ethnicity, culture, region of origin, clan, sub-clan, gender, age and/or any other characteristics. In preferred embodiments, the results may be displayed on a map representation, in a textual format, combinations thereof, or in any other formats specified by a user.

The following are preferred steps performed in the method of the software program for determining nationality, ethnicity, culture, region of origin, clan, sub-clan, age and/or gender of a selected name:

(1) The software program preferably determines all possible onomastic elements within a selected name that may be useful in determining a selected name's nationality, ethnicity, culture, region of origin, clan, sub-clan, age and/or gender. This may include initial, median and final classifications of onomastic elements.

(2) The software program preferably takes the onomastic elements from the selected name and compares the onomastic elements to the one or more databases. The one or more databases preferably contains information correlating onomastic elements to categorizations, such as sets of nationality, ethnicity, culture, region of origin, clan, sub-clan, age and/or gender.

(3) The software program preferably executes the one or more algorithms and selects a nationality, ethnicity, culture, region of origin, clan, sub-clan, age and/or gender with the highest probability of matching the onomastic elements.

(4) The results of the matching process preferably are displayed to the user in one or more formats depending upon the user's preferences.

As discussed above, determining a probable categorization, i.e. nationality, ethnicity, region of origin, age and/or gender, of a particular proper name can be a highly involved process. Some names, however, such as Kowalski, are easily identified. "Kowal", the Polish word for "smith", is added to "ski", a suffix denoting nobility. Historically, this particular suffix was often added to the family names of commoners in nineteenth century Poland because many people wanted to be considered "noble". Unfortunately, often a case-by-case name analysis of this type can be time consuming. Furthermore, this type of case-by-case analysis is not practical or possible in applications requiring the analysis and searching of large numbers of names, for instance, a census. The automated software method of the present invention provides a valuable resource in onomastic research. The relatively ordered structure of languages and familial naming systems allows automation of the name analysis process.

A preferred first step in determining categorization of a selected name may be creation of one or more databases. The one or more databases are preferably created before running the software program of the present invention to determine categorization of a selected name. Databases may be created for nationality, ethnicity, culture, region of origin, clan, sub-clan, gender, age and/or any other characteristics. The one or more databases may also exist separately for surnames, full names, etc. The one or more databases preferably identify the relative probabilities that a given onomastic element falls within a given sub-categorization. For example, a database for country of origin may identify that an initial "K" onomastic element has a 0.15 probability of being a Polish name, a 0.11 probability of being a Russian name, a 0.01 probability of a being a Chinese name, etc. for each of the countries included in the country of origin database. The database for country of origin may contain all initial, medial and final onomastic elements and associated probabilities for nationalities.

An initial step in the creation of each of the one or more databases may be to identify one or more lists of names for use by in the database creation method. Lists of names may come from various sources, including, but not limited to, government census data, the Internet, business customer lists, and others. Preferred lists of names will include categorization of the name by nationality, ethnicity, culture, region of origin, clan, sub-clan, age, gender, and/or other categories. The lists are preferably pre-categorized by nationality, ethnicity, culture, region of origin, clan, sub-clan, age and/or gender or may be categorized by the user before entry into a convolution algorithm. Pre-categorized lists may be manually classified according to nationality, ethnicity, culture, region of origin, clan, sub-clan, age and/or gender. For example, pre-categorized lists may identify the name "Kolo" as being having Poland as a country of origin. Various pre-categorized lists may have different degrees of trustworthiness that may be considered as described below.

One or more lists may exist containing names classified based on categorizations such as nationality, ethnicity, culture, region of origin, clan, sub-clan, age and/or gender. The names from the one or more lists may be broken down into onomastic elements. Onomastic elements are preferably all letters and combinations of letters existing within a name. Onomastic elements are preferably further broken down into initial, medial and final onomastic elements. Initial onomastic elements are all letters and combinations of letters forming a beginning of a name. Medial onomastic elements are all letters and combinations of letters forming a middle of a name. Final onomastic elements are all letters and combinations of letters forming an end of a name. Other modified definitions of initial, medial and final onomastic elements are possible depending on particular situations. For example, initial onomastic elements may be limited to the first three letter combinations of a name. In a preferred example, the name "Kolo" may have initial onomastic elements of "K", "KO", "KOL", and "KOLO". Medial onomastic elements may be "O" and "OL". Final onomastic elements may be "O", "LO", "OLO", and "KOLO".

During the creation of a database for each categorization, a series of onomastic convolutions are performed on pairs of names from the one or more lists of names. Convolutions are generally mathematical operators that take two functions and produce a third function that represents the amount of overlap between the first function and the reversed and translated second function. Preferably, the creation of the one or more databases performs an array of thousands or more individual convolutions. Larger sample sizes may give more accurate results when the one or more databases are used for analysis of a selected name. The result of the onomastic convolution preferably gives character combinations and positional information about combinations of names. The results of the series of convolutions may be one or more databases containing normalized probabilities that a particular onomastic element belongs to each sub-categorization. The one or more resultant databases preferably further break down each onomastic element into three positional values: initial, medial, and final. Therefore, the onomastic element "A" will be found three times within the one or more databases, i.e. an initial "A", a medial "A" and a final "A".

Figure 1A:
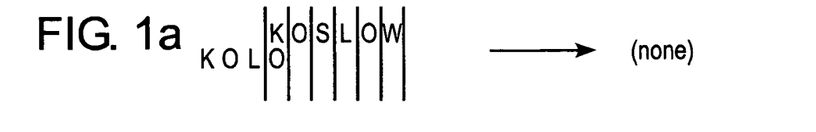
FIGS. 1a-1i show an exemplary onomastics convolution of the surnames "Kolo" and "Koslow".
Figure 1B:
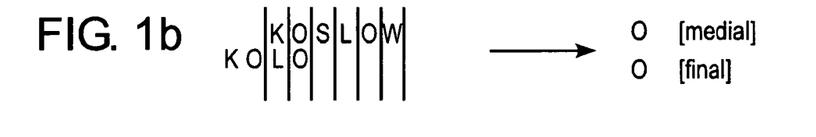
Figure 1C:
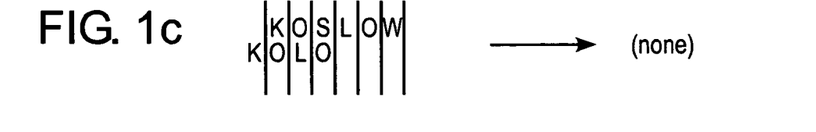
Figure 1D:
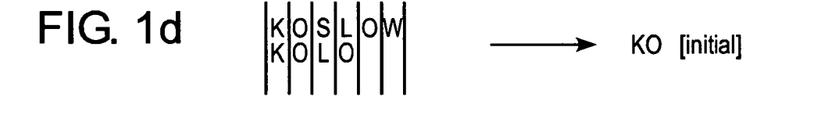
Figure 1E:
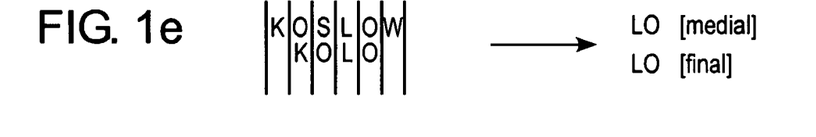
Figure 1F:
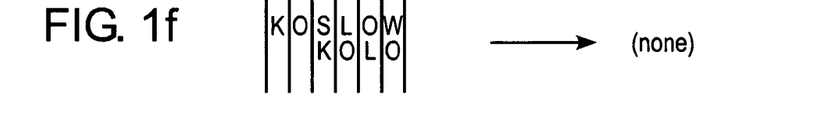
Figure 1G:
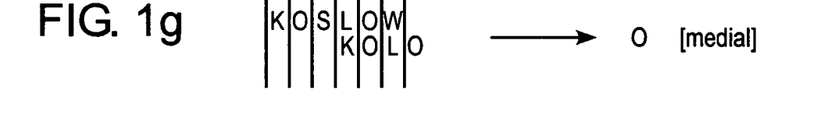
Figure 1H:
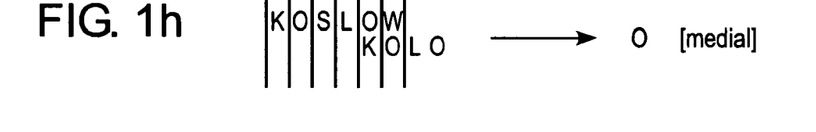
Figure 1I:
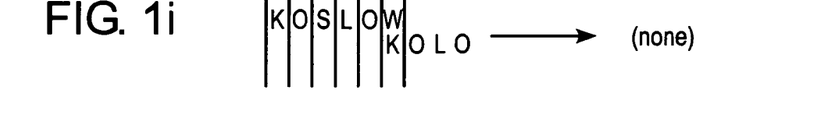

FIGS. 1a-1i show an example of a single onomastic convolution performed during creation of the one or more databases that takes nine discrete steps. The example from FIGS. 1a-1i uses a convolution of the names Kolo and Koslow. FIG. 1a shows a first step of an onomastics convolution that results in no matches between the initial "K" of Koslow and final "O" of Kolo. FIG. 1b shows a second step of the onomastics convolution where the medial "O" of Koslow matches the final "O" of Kolo. FIG. 1c shows a third step of the onomastics convolution that results in no matches. FIG. 1d shows a fourth step of the onomastics convolution where a match exists between the initial "KO" of Koslow and the initial "KO" of Kolo. FIG. 1e shows the fifth step of an onomastics convolution where a match exists between the medial "LO" of Koslow and the final "LO" of Kolo. FIG. 1f shows a sixth step of the onomastics convolution that results in no matches. FIG. 1g and FIG. 1h show a seventh and eighth step, respectively, of the onomastics convolution. Both FIG. 1g and FIG. 1h show a match exists between a medial "O" of Koslow and the medial "O" of Kolo. The results of FIG. 1g and FIG. 1h may be disregarded for purposes of compiling an onomastic element list. This data, however, may be used later in computing the frequency of the given onomastic element or for other purposes. because the results are duplicates the medial "O" found previously in FIG. 1*b*. FIG. 1*i* is a ninth step in the onomastics convolution that results in no matches. The steps found in FIGS. 1*a*-1*i* show a complete onomastics convolution for the names Koslow and Kolo.

The onomastics convolution of Koslow and Kolo result in a determination of similar building blocks. From the exemplary convolution, the similar building blocks include an initial "K", a medial "KO", "O", and "LO", and a final "O" and "LO". These building blocks are common onomastic elements for those specific two names.

Onomastics convolutions preferably are performed for many different names from many different nationality, ethnicity, culture, region of origin, clan, sub-clan, age and/or gender. Large numbers of distinct onomastics convolutions preferably are combined to create a database of information related to similar onomastic elements for each nationality, ethnicity, culture, region of origin, clan, sub-clan, age and/or gender. As more names of a single nationality, ethnicity, culture, region of origin, clan, sub-clan, age and/or gender are analyzed and convoluted, the frequency of specific onomastic elements in each categorization may form an onomastics signature of that particular categorization. Individual names do not necessarily carry all the similar onomastic elements of a given nationality, ethnicity, culture, region of origin, clan, sub-clan, age and/or gender. The use of a large enough database may, however, may create a probability that a selected name belongs to a particular nationality, ethnicity, culture, region of origin, clan, sub-clan, age and/or gender rather than another nationality, ethnicity, culture, region of origin, clan, sub-clan, age and/or gender.

Figure 2:
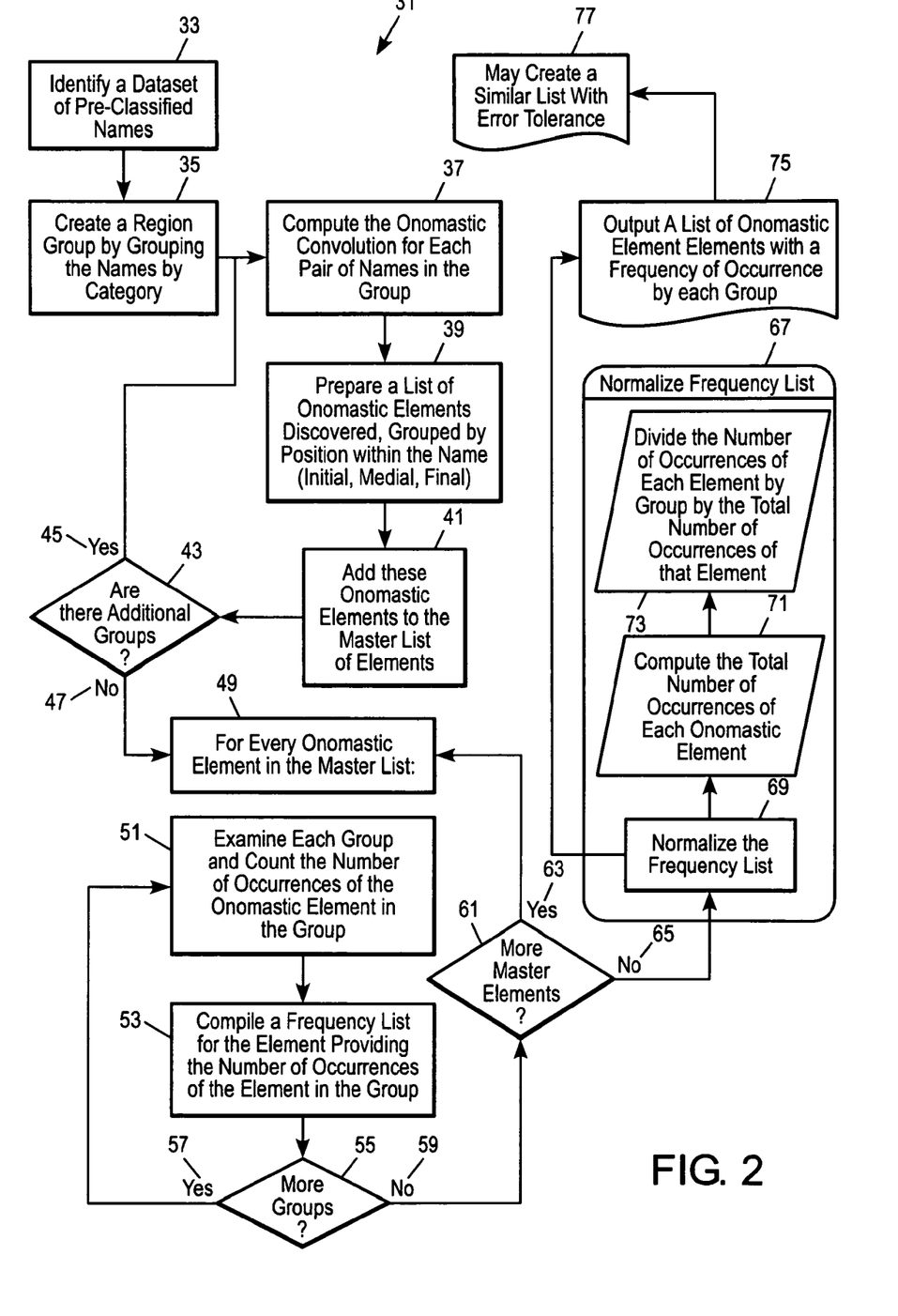
FIG. 2 is a flow diagram showing the process for taking results of individual convolutions and determining overall probabilities that an onomastic element belongs to a particular category.

FIG. 2 is a flow diagram showing the process 31 for taking results of individual convolutions and determining overall probabilities that an onomastic element belongs to a particular category.

Initially, a dataset of pre-classified names may be identified 33. A grouping by region or other categorization may be created 35 by grouping the pre-classified names by category. Onomastic convolutions for all pairings of names in the group may be computed 37. A list of onomastic elements discovered during the onomastic convolutions may be prepared 39. The list of onomastic elements may be grouped by position within the name, such as initial, medial and/or final. The onomastic elements discovered during the onomastic convolutions may be added 41 to a master list of elements. A determination may be made regarding whether there are additional groups that need analysis 43. If yes 45, then the process may cycle back through steps 37 through 43 until there are no additional groups that need analysis.

When there are no additional groups 47 that need analysis, a master list of elements may be updated 49.

Each group may be examined and the number of occurrences of an onomastic element may be counted 51. A frequency list for all onomastic elements in each group may be compiled 53 where the frequency list may contain the number of occurrences of all onomastic elements in the group. A check may be performed to determine if there are additional groups 55. If yes 57, steps 51 through 55 are repeated until there are no additional groups that need analysis.

When there are no additional groups 59, a determination is made regarding whether there are more elements on the master list of elements 61. If yes 63, the master list of elements may be updated 49.

When there are no additional elements on the master list of elements 65 the frequency list may be processed 67. The frequency list may be normalized 69. The total number of occurrences of each onomastic element may be computed 71. The number of occurrences of each onomastic element by group may be divided by the total number of occurrences of each onomastic element 73. The result is a normalized frequency list.

Additionally, after normalizing the frequency list 69, a list of onomastic elements with a frequency of occurrence by each group may be output 75. A similar list with error tolerance may be created 77.

Figure 3:
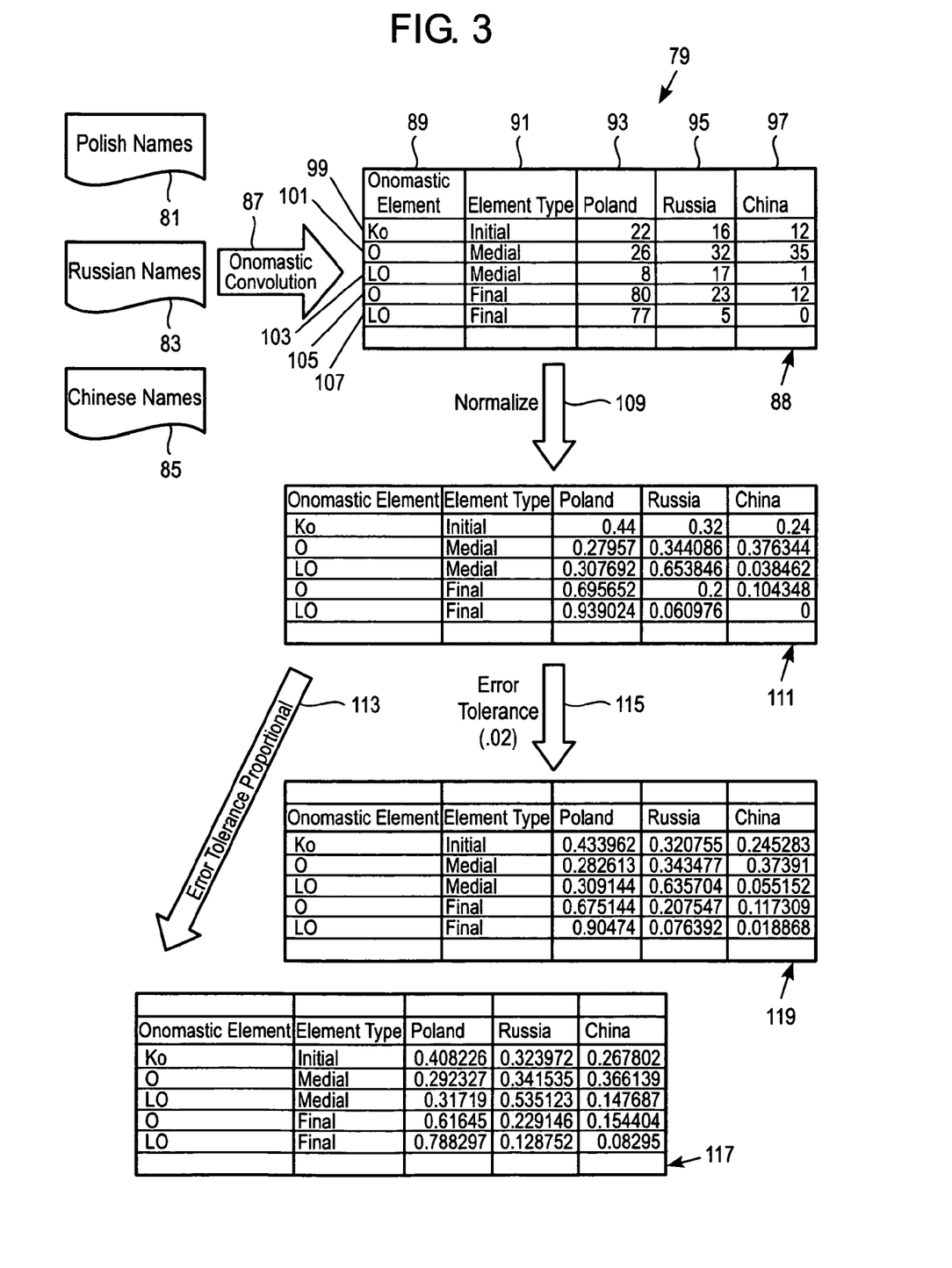
FIG. 3 is a flow diagram showing an optional error tolerance calculation.

FIG. 3 is a flow diagram showing an optional, exemplary error tolerance calculation 79. In this example, the name "Kolo" is used. Polish names 81, Russian names 83 and Chinese names 85 may be entered into a series of onomastic convolutions 87. The result of the onomastic convolutions 87 is a table or database 88 showing the onomastic elements 89 in "Kolo", the type of onomastic element 91, i.e. initial, medial, or final, and the number of occurrences for Poland 93, Russia 95 and China 97. In this example, the onomastic elements analyzed are an initial "KO" 99, a medial "O" 101, a medial "LO 103, a final "O" 105 and a final "LO" 107.

The values within the table or database 88 are then normalized 109, resulting in a normalized table or database 111. The normalized table or database 111 may be processed by a proportional error tolerance 113, a 0.02 error tolerance 115, or other similar error tolerance. The proportional error tolerance 113 may result in a proportional table or database 117 and the 0.02 error tolerance 115 may result in a 0.02 table or database 119.

After performing an array of convolutions and process, a vector may be created such that an initial "A" onomastic element may have a 0.09 normalized probability of being of Polish nationality, a 0.06 normalized probability of being of Russian nationality, a 0.01 normalized probability of being of Chinese nationality, etc. The percentages are reached by summing the number of occurrences of a particular onomastic element occurring within a given categorization. For example, an initial "A" onomastic element may occur 78 times in convolutions of Polish names, 14 times in convolutions of Russian names, and 3 times in convolutions of Chinese names, etc.

Percentages are preferably calculated and normalized to create the vectors containing information correlating the probability that a given onomastic element belongs to a particular sub-categorization. The probabilities for each onomastic element are preferably normalized such that the probabilities that a specific onomastic element correlates to a sub-categorization sum to one hundred percent. The resultant vectors from the onomastic convolutions from each sub-categorization may be combined into a master database. Master databases may contain information relating all onomastic elements to probabilities that the onomastic elements exist is each sub-categorization.

Preferably, separate master databases are created for each categorization. For example, separate databases may exist for nationality, ethnicity, region of origin, clan, sub-clan, gender, age and/or any other characteristics. The master databases are preferably normalized to find percentages of each element and their relative frequency within each categorization. In certain embodiments the master databases allow the software program of the present invention to give appropriate weight to onomastic elements that are common in one categorization, but not as common in another categorization.

A master database for nationality may contain information correlating each initial, medial and final combination of letters with each nationality. For example, the database may contain the following information: an initial "A" has a 0.03 normalized probability of being Polish, a 0.05 normalized probability of being Russian, a 0.01 normalized probability of being Chinese, etc.; an initial "AB" has a 0.01 normalized probability of being Polish, a 0.04 normalized probability of being Russian, a 0.11 normalized probability of being Chinese, etc.; a medial "A" has a 0.02 normalized probability of being Polish, a 0.03 normalized probability of being Russian, a 0.09 normalized probability of being Chinese, etc.; and so on.

Each initial, medial and final combination of letters in the one or more master databases may contain a vector of information. For example, a vector from the above listing may be that an initial "A" has a 0.03 normalized probability of being Polish, a 0.05 normalized probability of being Russian, a 0.01 normalized probability of being Chinese, etc. The probabilities are preferably normalized so that the sum of all probabilities over each categorization is equal to one.

The one or more master databases may be installed on local computers or on a networked server. The one or more databases may include large amounts of information. Storage of the one or more databases in a centralized location may decrease space requirements on local computers.

After creation of the one or more master databases the software program may run one or more algorithms using the one or more master databases to determine categorization of a selected name.

A selected name may be entered into the software program through an input. The input may be a command line input, graphical user interface, or other user interface. The selected name is then broken down into component onomastic elements. The following describes a simplified example for illustrative purposes only. For purposes of this example, the name "Kolo" is being analyzed for nationality assuming only three languages exist, Polish, Russian and Chinese. An actual implementation of embodiments of the present invention would preferably use most or all existing languages.

For this example, the name "Kolo" may contain the following onomastic elements: initial "K", "KO", "KOL", and "KOLO", medial "O", "OL", and "OLO", and final "O", "LO", "OLO", and "KOLO".

Each onomastic element in the selected name is looked up in the master database for the category being analyzed. For example, the nationality master database is called when determining nationality or the region of origin master database is called when determining region of origin.

In the "Kolo" example, the following onomastic element vectors are preferably called from the nationality master database: initial "K", "KO", "KOL", and "KOLO", medial "O", "OL", and "OLO", and final "O", "LO", "OLO", and "KOLO". Each of the onomastics elements preferably corresponds to vectors of normalized probabilities that each onomastic element belongs to a particular nationality. For example, an initial "K" may have a 0.53 normalized probability of being Polish, a 0.31 normalized probability of being Russian, and a 0.16 normalized probability of being Chinese. An initial "KO" may have a 0.62 normalized probability of being Polish, a 0.21 normalized probability of being Russian, and a 0.17 normalized probability of being Chinese.

The algorithm of the present invention may take all of the onomastic element vectors associated with the name "Kolo" and multiply the normalized probabilities for all onomastic elements within each language to create weights NO that the name "Kolo" belongs to a particular nationality. For example, $W_{POLAND}$ for "Kolo" may include the multiplication of initial "K"=0.53 normalized probability, initial "KO"=0.62 normalized probability, etc. The same multiplication within nationalities is then done for Russian and Chinese.

The results of the nationality multiplication may give a result such as $W_{POLAND}$=0.23, $W_{RUSSIA}$=0.04, and $W_{CHINA}$=0.01. The results of the nationality multiplication are preferably then normalized by dividing $W_i$ by N, where N equals the sum of all weights ($W_i$). In the "Kolo" example, N=$W_{POLAND}$+$W_{RUSSIA}$+$W_{CHINA}$=0.28. Therefore, the probability of the name being Polish ($P_{POLAND}$)=$W_{POLAND}$/N=0.82. The same calculation is performed for each nationality. In this example, $P_{RUSSIA}$=0.14 and $P_{CHINA}$=0.04.

From this example analysis of the name "Kolo", it is likely that the name is of Polish origins. Therefore, the algorithm would preferably return Poland as the more likely nationality and not Russia or China.

Embodiments of the present invention may also include further algorithms. The further algorithms may include algorithms that use the algorithm described above or may be used separately from the above algorithm.

For example, in the course of identifying a categorization of a selected name, pre-classified lists may be used to make a faster and more accurate determination of the likelihood that a name belongs to a particular category. The pre-classified list may be a list of names whose nationality has been verified. For example, a list of verified names may state that "Kolo" is a Polish name.

In one preferred algorithm, if a selected name is found on a pre-classified list, the above algorithm using the one or more master databases is not needed and the results found in the list are output to the display. For example, if the name "Kolo" was found on a nationality list as being Polish, then "Poland" would be output as the nationality without needing to perform the algorithm related to the nationality master database.

Furthermore, there may be lists of different trustworthiness. For example, a first list may be hand certified by an accurate name classifier and a second list may be downloaded off the Internet without verification. If the selected name is not found on either list, then the algorithm using the one or more master databases may be used. If the selected name is found on only one of the lists, then the categorization of the list may be output. However, if a selected name is entered into the software program and found on both the first and second lists, then an analysis can be performed to determine categorization. If the categorization from both the first and second lists is in agreement, then the result is output to the user. If the categorizations from the first and second list do not match, then the categorization of the first list preferably dominates.

In a preferred embodiment, multiple lists and the master database algorithm are used together to create an accurate and efficient determination of categorization of a selected name. Alternatively, one list may be used with the master database algorithm to determine categorization of a selected name.

Continuing the above "Kolo" example, an overall weight ($W_{ALGORITHM}$) is assigned to the results of the algorithm. For example, since $P_{POLAND}$=0.82, $P_{RUSSIA}$=0.14, and $P_{CHINA}$=0.04. $W_{ALGORITHM}$ is created as a vector (1, 0, 0), where the values are (Poland, Russia, China). A 1 is assigned to the greatest probability and the remaining values are set to 0. Other assigned value schemes are possible.

A weight ($W_{FIRST}$) may be assigned to the first list of preferred categorized names. In a preferred embodiment, if there are more than one possible categorizations for a selected name, i.e. the nationality of a selected name could be Polish, Russian, and Chinese, and then each possible categorization is given a weighted number. Preferably, the weighted numbers are determined before use in the software program. For example, the most probable categorization may be given a value of 5, the second most probable categorization may be given a value of 4, the third most probable categorization may be given a value of 3, and the remaining categorizations may be give a value of 2. In the "Kolo" example, since there are only three possible nationalities, the values may be assigned differently. For example, Polish may be given a weight of 5, Russian a value of 3 and Chinese a value of 2. The result $W_{FIRST}$ may be a vector with values (5, 3, 2). Other assignments of values are possible.

A weight ($W_{SECOND}$) may be assigned to the second or less preferred list of categorized names. A vector for $W_{SECOND}$ may be assigned values of 1 or 0 depending on whether the name was present for each particular categorization. In the "Kolo" example, the result $W_{SECOND}$ may be a vector with the values (1, 0, 0), where "Kolo" only appeared as a nationality in Poland and not in Russia or China.

An array may be set up to determine the categorization of a selected name. The three weight vectors, $W_{ALGORITHM}$, $W_{FIRST}$, and $W_{SECOND}$, may be compared and analyzed. A total weigh ($W_{TOTAL}$) may be calculated according to the formula $W_{TOTAL}=7*W_{FIRST}+3*W_{SECOND}+W_{ALGORITHM}$. Other coefficients and weightings and formulas are possible depending on the reliability of the sources used for each individual weight vector. Preferably, the formula is weighted such that the first or preferred list dominates over the second list and the algorithm, and the second list dominates over the algorithm. Other weightings are possible.

In the "Kolo" example, the $W_{TOTAL-POLAND}$ for Poland may be 7(5)+3(1)+(1)=39. The $W_{TOTAL-RUSSIA}$ for Russia may be 7(3)+3(0)+(0)=21. The $W_{TOTAL-CHINA}$ for China may be 7(2)+3(0)+(0)=14. The weights are preferably then normalized for overall probabilities (P) for each nationality. For example, $W_{POLAND-OVERALL}=W_{TOTAL-POLAND}/N$, where N is equal to the sum of all the $W_{TOTAL}$, or 39+21+14=74. In the "Kolo" example, $W_{POLAND-OVERALL}=0.52$, $W_{RUSSIA-OVERALL}=0.28$, and $W_{CHINA-OVERALL}=0.19$. Therefore, the software would return a nationality of Poland and not Russia or China.

It is preferable that the three methods, i.e. first list, second list and algorithm, are in agreement. However, it is possible that the three methods may result in different categorizations. In these situations, the overall weighting may give a final result despite disagreements between methods. For example, if the weight vectors were changed to $W_{FIRST}=(5, 3, 2)$, $W_{SECOND}=(0, 0, 1)$ and $W_{TOTAL-RUSSIA}=(0, 1, 0)$, then the $W_{TOTAL-POLAND}$ for Poland may be 7(5)+3(0)+(0)=35. The $W_{TOTAL-RUSSIA}$ for Russia may be 7(3)+3(0)+(1)=22. The $W_{TOTAL-CHINA}$ for China may be 7(2)+3(1)+(0)=15. The weights are preferably then normalized for overall probabilities (P) for each nationality. For example, $W_{POLAND-OVERALL}=W_{TOTAL-POLAND}/N$, where N is equal to the sum of all the $W_{TOTAL}$, or 35+22+15=72. In the "Kolo" example, $W_{POLAND-OVERALL}=0.49$, $W_{RUSSIA-OVERALL}=0.31$, and $W_{CHINA-OVERALL}=0.21$. Therefore, the software would still return a nationality of Poland.

In another preferred embodiment, the master database algorithm may be used with only one list. Here, $W_{ALGORITHM}$ may equal (1, 0, 0) where a 1 is assigned to the highest probability and a 0 is assigned to all other probabilities. $W_{LIST}$ may equal (1, 0, 0) where a 1 is assigned when a name appears on the list for a particular categorization and a 0 is assigned when a name does not appear on the list for a particular categorization. In general, an algorithm may be such that $W_{TOTAL}=2*W_{LIST}+W_{ALGORITHM}$. Other weightings are possible. In the "Kolo" example, $W_{TOTAL-POLAND}=2(1)+(1)=3$, $W_{TOTAL-RUSSIA}=2(0)+(0)=0$, $W_{TOTAL-CHINA}=2(0)+(0)=0$. Poland would be selected as the nationality instead of Russia or China.

In some cases, there may be a disagreement between the list and the algorithm. For example, the algorithm vector may be (0, 1, 0) and the list vector may be (1, 0, 0). In this case, $W_{TOTAL-POLAND}=2(1)+(0)=2$, $W_{TOTAL-RUSSIA}=2(0)+(1)=1$, $W_{TOTAL-CHINA}=2(0)+(0)=0$. Poland would still be selected as the nationality instead of Russia or China because it has the highest weight.

The above examples have been performed primarily with nationality; however, other categorizations are possible. A complete analysis would include a similar analysis for each categorization desired. Each categorization preferably has a separate master database.

The software program of the present invention may use any of the above techniques to determine categorizations of a selected name. For example, the software program may use the algorithm, a preferred name list, a secondary name list, and/or any individually or in combination. The algorithm calculation may be skipped altogether if the selected name is found on one or more of the preferred name list or secondary name list.

Different databases may be used for each categorization, i.e. nationality, ethnicity, culture, region of origin, clan, sub-clan, age, and/or gender.

Additionally, algorithms of the present invention may consider information about an individual of interest other than that information found in the name itself. The algorithms may take into account other information such as maiden names, names of spouses, names of siblings and other family members, names of traveling companions, place of birth, travel destinations, names and/or call destinations from phone records, religion, and/or any other additional information about that individual. Additional information may be stored in databases or entered by the user during the input phase of the software program. The additional information may be accessed during operation of the software program to further refine the algorithm and provide additional accuracy. For example, if an individual of interest is found to travel often to Poland with other individuals with Polish names, then the algorithm may return a higher probability that the individual of interest is Polish.

In most situations, after running the algorithms of the software program, there should not be disagreement between related categorizations. For example, the analysis should not result in a nationality of Poland and a continent of Asia. In certain circumstances, however, this may occur. In that event, a correction may be applied to ensure accuracy and alignment between categorizations. Generally, nationality may be set to dominate over sub-continent or continent, or other similar categorizations; however, other preferences may be set for particular situations.

To ensure agreement in results, total weight arrays for various categorizations may be arrayed. In the "Kolo" example, $W_{NATIONALITY-OVERALL}=(W_{POLAND-OVERALL}, W_{RUSSIA-OVERALL}, W_{CHINA-OVERALL})=(0.52, 0.28, 0.19)$. $W_{NATIONALITY-OVERALL}$ may be arrayed with the similar vectors $W_{SUBCONTINENT-OVERALL}$, $W_{CONTINENT-OVERALL}$ and/or other weight vectors. The results for each nationality are multiplied together to get a resultant vector of $W_{AGREEMENT}=(W_{POLAND-AGREEMENT}, W_{RUSSIA-AGREEMENT}, W_{CHINA-AGREEMENT})$. The resultant vector of $W_{AGREEMENT}$ is then normalized, where N equals the sum of all the individual agreement weights. For example, the $W_{AGREEMENT-OVERALL}=(W_{POLAND-AGREEMENT}/N, W_{RUSSIA-AGREEMENT}/N, W_{CHINA-AGREEMENT}/N)$. Preferably, the agreement weight with the highest value is chosen as the output and the other values are amended to correlate. For the "Kolo" example, if $W_{AGREEMENT-OVERALL}$=(0.65, 0.22, 0.13), then Poland is chosen as the nationality, Eastern Europe is chosen as the subcontinent, and Europe is chosen as the continent.

Figure 4:
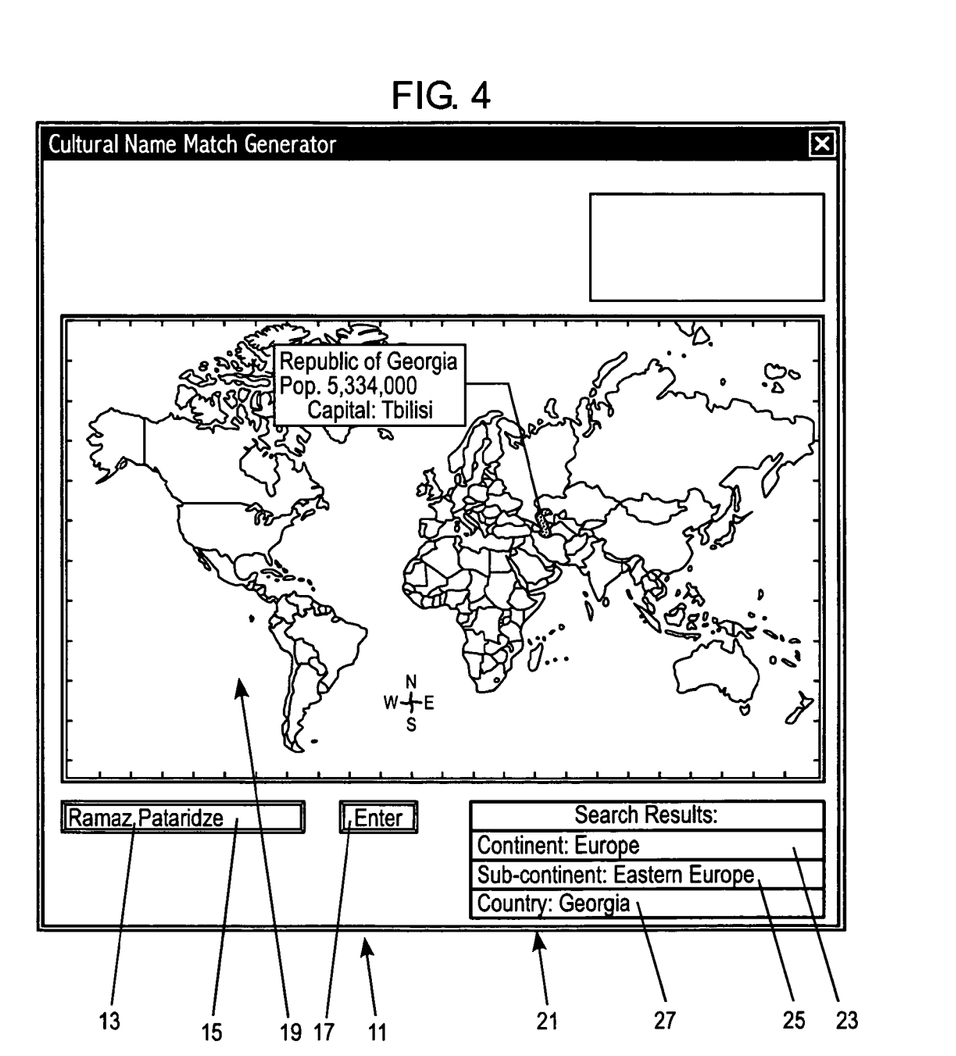
FIG. 4 is an exemplary screenshot showing a user input and result.
Figure 5:
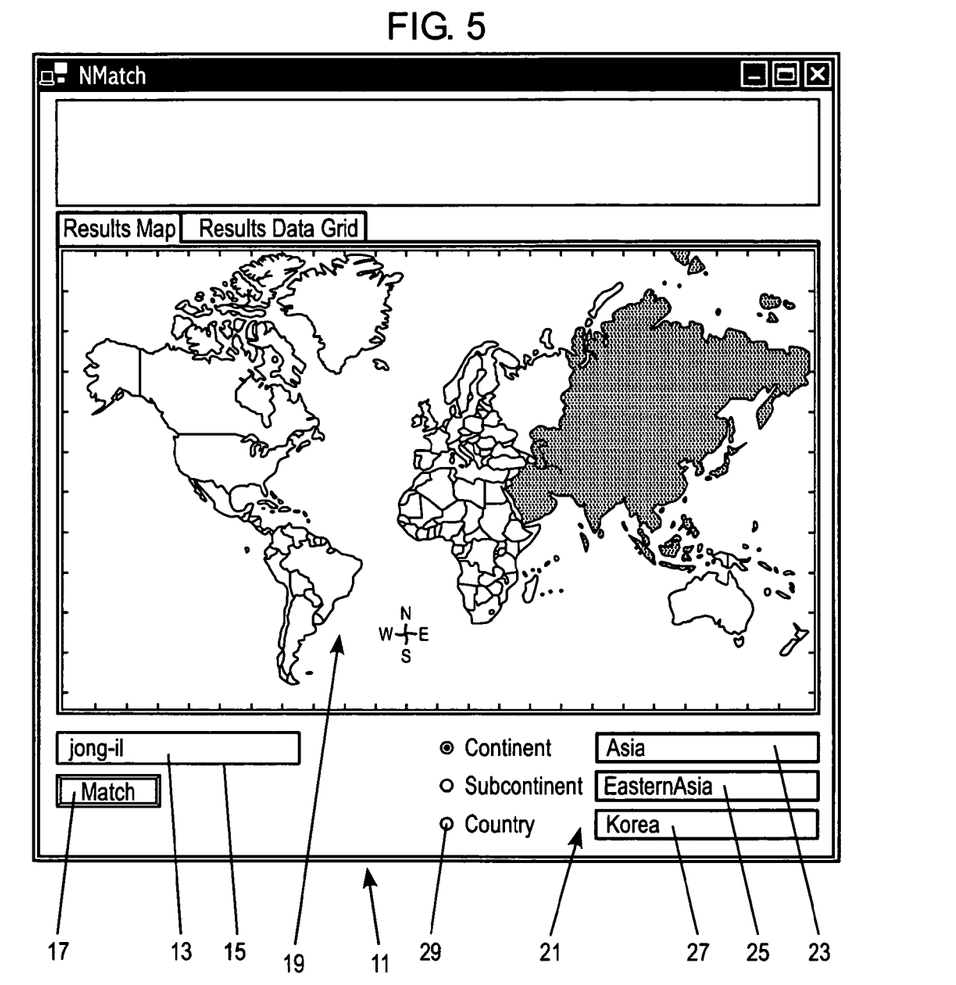
FIG. 5 is another exemplary screenshot showing a user input and result.

FIGS. 4 and 5 show examples of screen shots of results of a name analysis.

FIG. 4 shows a preferable geographic map display 11 for the results of a cultural name match for the name "Ramaz Pataridz". A user types a selected name 13 into a command line interface 15 or other similar interface within a broader graphical user interface 11 or other similar interface. After typing the selected name 13 into the command line interface 15, a user may engage the software program to begin analysis by pressing an "Enter" button 17 within the graphical user interface 11 or an "Enter" key on a keyboard, or through another similar method. Alternatively, the user may add additional information when prompted before beginning the name analysis. The software program may then perform the necessary name analysis on the selected name 13 and selects one or more highest probability matches. The graphical user interface 11 may then displays the results of the cultural name match for the selected name 13. The results may be displayed on a world map 19 and in a textual form 21 listing a most likely continent 23, sub-continent 25, and country of origin 27 for the selected name 13. The results page, 11, may give an extended list of probabilities where the selected name 13 admits to ambiguous cultural origins. In the example of FIG. 4, the selected name 13 returns the following results: Continent—Europe; Sub-continent—Eastern Europe; and Country—Georgia.

FIG. 5 shows a preferable display 11 for the results of a cultural name match for the selected name 13 "Jong-Il". In the example of FIG. 5, the selected name 13 returns the following results: Continent—Asia; Sub-continent—Eastern Asia; and Country—Korea. The world map 19 may be interactive. Radio buttons 29 may be included to select between displays of continent 23, sub-continent 25, and country of origin 27. Other displays may be included, such as age, gender and any other relevant characteristics. Other alternatives include zoom features to more closely inspect the geographical area associated with the selected area.

In a preferred embodiment, the software program of the present invention can have two modes: batch and single-entry. In addition to a single entry mode described above, embodiments of the software program of the present invention may also have a batch function for processing lists of selected names and longer files containing selected names. Batch mode may work in a similar fashion to single entry mode, except that the results are preferably displayed in list form and may be categorized. Batch mode may allow for batch processing of a list of names and outputting the matches to a file that can be reviewed or edited by a user. Batch processing may automate large searches allowing determining nationality, ethnicity, region of origin, age and/or gender of selected names for large amounts of data processed in a short period of time and/or cross linking members of the batch list. Batch operation may be performed in a similar manner to single entry mode, except that subsequent names are processed without further input from the user.

During batch entry, a user may load a selected file into the software program. While running the software program of the present invention profiling data may be delivered up to or exceeding 72,000 names per hour on a standard desktop computer. The results may be outputted into a file for easy access and analysis by the user.

Embodiments of the present invention may compare onomastic elements within a name and/or surname to culturally specific patterns and incorporate a comparison file of more common culturally specific names and surnames to perform faster and more accurate analysis than existing systems. In preferred embodiments, the software program may return correct results for nationality, ethnicity, culture, region of origin, clan, sub-clan, age, and/or gender up to or exceeding about 90 percent of the time on average. Embodiments of the present invention may accurately identify up to about 90 percent or more of names from up to about 112 or more countries from six continents with accuracy rates as high as about 97 percent or more for culturally distinctive subsets, such as Hispanic or Arabic names. Embodiments of the present invention can process large amounts of information reliably, deliver results quickly, and process information accurately with a high level of confidence with an easy to use interface.

It is readily apparent that embodiments of the present invention are a valuable tool in the "War on Terror" and for the prevention of terrorism. Versions and embodiments can be contained within a laptop or PDA or accessible via the internet. In addition, this test can be augmented with a list of questions to pose to the queried subject to further determine the correct origin of the individual. Such questions can be for information that is expected to be known of individuals from the predicted local information expected to be known by individuals originating from wherever the suspect claims they are from. This invention also permits business models based on selling access to the program and databases to simplify security screening. Use of the software program of the present invention can permit field agents to quickly and accurately determine if an individual is from the same family and/or tribe as known terrorists. Such information may allow field agents to determine whether or not an individual should be questioned.

In addition to use in the "War on Terror", this invention may have benefits in business and marketing. By rapidly identifying the cultural background of a potential customer, it may be possible to modify the sales pitch or the product(s) being offered. Such individualized salesmanship has wide applicability to telemarketers as well as mass mailing companies that need to better direct their efforts.

Data processed by the software program of the present invention may be used to update entries in onomastic databases. While updating of the one or more master databases is possible, once a significant number of onomastic convolutions are performed the one or more master databases no longer require continuous updating. However, updating entries in databases can increase the accuracy of the data by adding new information, which consequently allows governments, businesses and marketers to better customize their use of onomastic information. Quick results and accurate confidence values from the software of the present invention may improve a user's ability to make quality decisions from the data in time constrained situations.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A method of creating a master database comprising the steps of:
   i. accepting a list of names as input wherein each name is associated with at least one category;
   ii. selecting at least one pair of names from the list wherein the names have at least one category in common;
   iii. performing an onomastic convolution on each of the pair Of names to produce onomastic groups resulting from the onomastic convolution;
   iv. counting the number of occurrences of each onomastic group resulting from the onomastic convolution of step (iii) to output a number for each onomastic group;
   v. preparing a frequency list by adding the output number for each onomastic group to a master list of all onomastic elements;
   vi. normalizing the elements in the master list to create a master database comprising normalized probabilities for each categorization.

2. The method of claim 1, wherein the names are associated with at least one category selected from the group comprising: nationality, ethnicity, culture, region of origin, clan, sub-clan, age and gender.

3. The method of claim 1, wherein the onomastic groups are further broken down into initial, medial, and/or final.

4. The method of claim 1, wherein a master database is created for each category.

* * * * *